(12) United States Patent
Hou et al.

(10) Patent No.: US 11,431,407 B2
(45) Date of Patent: Aug. 30, 2022

(54) HARDWARE-BASED PROTECTION GROUP SWITCHING METHOD AND OPTICAL COMMUNICATION EQUIPMENT

(71) Applicant: Sino-Telecom Technology Co., INC., Shanghai (CN)

(72) Inventors: Lei Hou, Shanghai (CN); Zhiyuan Wu, Shanghai (CN); Hu Xie, Shanghai (CN); Lin Li, Shanghai (CN)

(73) Assignee: Sino-Telecom Technology Co., INC, Shanghai (CN)

(*) Notice: Subject to any disclaimer, the term of this patent is extended or adjusted under 35 U.S.C. 154(b) by 0 days.

(21) Appl. No.: 16/623,759

(22) PCT Filed: Jun. 21, 2018

(86) PCT No.: PCT/CN2018/092101
§ 371 (c)(1),
(2) Date: Dec. 17, 2019

(87) PCT Pub. No.: WO2019/100705
PCT Pub. Date: May 31, 2019

(65) Prior Publication Data
US 2020/0358525 A1 Nov. 12, 2020

(30) Foreign Application Priority Data
Nov. 22, 2017 (CN) .......................... 201711176829.7

(51) Int. Cl.
*H04B 10/032* (2013.01)
*H04Q 11/00* (2006.01)

(52) U.S. Cl.
CPC ....... *H04B 10/032* (2013.01); *H04Q 11/0005* (2013.01); *H04Q 11/0067* (2013.01);
(Continued)

(58) Field of Classification Search
None
See application file for complete search history.

(56) References Cited

U.S. PATENT DOCUMENTS

| 8,665,867 B2 * | 3/2014 | Wu | H04L 41/0668 370/360 |
| 9,143,227 B2 * | 9/2015 | Moynihan | H04B 10/032 |
| 2007/0211742 A1 * | 9/2007 | Trisno | H04J 14/0295 370/419 |

FOREIGN PATENT DOCUMENTS

| CN | 101330343 A | 12/2008 |
| CN | 102868441 A | 1/2013 |
| CN | 102868441 A * | 1/2013 |

* cited by examiner

*Primary Examiner* — David W Lambert

(57) ABSTRACT

Disclosed is a hardware-based protection group switching method and optical communication equipment. The method includes: transmitting, by a FPGA in equipment when detecting switching triggering information indicating that a local network element possibly has switching triggering situations, the switching triggering information to each protection state machine through a hardware bus; determining, by each protection state machine according to related traffic flow information, one or more related protection groups that are possibly affected by each switching triggering situation, and generating each corresponding switching triggering condition according to each piece of switching triggering information; separately querying, by the protection state machines corresponding to the related protection groups, a pre-stored table for APS protocol operation results; and updating a cross connection table according to the operation results, and configuring the updated cross connection table to a cross connection chip or a packet switching chip through the FPGA.

24 Claims, 9 Drawing Sheets

(52) U.S. Cl.
CPC ............... *H04Q 2011/0047* (2013.01); *H04Q 2011/0081* (2013.01); *H04Q 2213/056* (2013.01)

| HAPS channel format | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| Request/ status | | | | Protection type | | | | Requested signal | | | | | | | | Bridged signal | | | | | | | | Local fault code | | | | | | | |
| | | | | A | B | D | R | | | | | | | | | | | | | | | | | | | | | | | | |

FIG. 3

| | LP® | SF_P® | FS_W® | FS_P® | SF_W® | SD_P® | SD_W® | MS_W® | MS_P® | WTR® | EXER_0® | EXER_1® | DNR® | NR | RR |
|---|---|---|---|---|---|---|---|---|---|---|---|---|---|---|---|
| LP | — | LP | LP | LP | LP | LP | LP | LP | LP | LP | LP | LP | LP | LP | LP |
| SF_P | SF_P (in this case, received K1/K2, namely, a remote request is meaningless) | | | | | | | | | | | | | | |
| FS_W | LP® | FS_W | — | FS_W | FS_W | FS_W | FS_W | FS_W | FS_W | FS_W | FS_W | FS_W | FS_W | FS_W | FS_W |
| FS_P | LP® | SF_P® | FS_W® | — | FS_P | FS_P | FS_P | FS_P | FS_P | FS_P | FS_P | FS_P | FS_P | FS_P | FS_P |
| SF_W | LP® | SF_P® | FS_W® | FS_P® | — | SF_W | SF_W | SF_W | SF_W | SF_W | SF_W | SF_W | SF_W | SF_W | SF_W |
| SD_P | LP® | SF_P® | FS_W® | FS_P® | SF_W® | — | SD_P | SD_P | SD_P | SD_P | SD_P | SD_P | SD_P | SD_P | SD_P |
| SD_W | LP® | SF_P® | FS_W® | FS_P® | SF_W® | SD_P® | — | SD_W | SD_W | SD_W | SD_W | SD_W | SD_W | SD_W | SD_W |
| MS_W | LP® | SF_P® | FS_W® | FS_P® | SF_W® | SD_P® | SD_W® | — | MS_W | MS_W | MS_W | MS_W | MS_W | MS_W | MS_W |
| MS_P | LP® | SF_P® | FS_W® | FS_P® | SF_W® | SD_P® | SD_W® | MS_W® | — | MS_P | MS_P | MS_P | MS_P | MS_P | MS_P |
| WTR | LP® | SF_P® | FS_W® | FS_P® | SF_W® | SD_P® | SD_W® | MS_W® | MS_P® | — | WTR | WTR | WTR | WTR | WTR |
| EXER_0 | LP® | SF_P® | FS_W® | FS_P® | SF_W® | SD_P® | SD_W® | MS_W® | MS_P® | WTR® | — | EXER_0 | EXER_0 | EXER_0 | EXER_0 |
| EXER_1 | LP® | SF_P® | FS_W® | FS_P® | SF_W® | SD_P® | SD_W® | MS_W® | MS_P® | WTR® | EXER_0® | — | EXER_1 | EXER_1 | EXER_1 |
| DNR | LP® | SF_P® | FS_W® | FS_P® | SF_W® | SD_P® | SD_W® | MS_W® | MS_P® | WTR® | EXER_0® | EXER_1® | — | DNR | DNR |
| NR | LP® | SF_P® | FS_W® | FS_P® | SF_W® | SD_P® | SD_W® | MS_W® | MS_P® | WTR® | EXER_0® | EXER_1® | DNR® | — | NR |

FIG. 5

| Protection state machine input | | | States and migration | | |
|---|---|---|---|---|---|
| Highest REQUEST | | REQUESTED SIGNAL | Remote APS SIGNAL | idle(0) | switched(1) | WTR(1) |

| | | | | | | |
|---|---|---|---|---|---|---|
| Remote | LP | 0 | 0 | idle | idle | idle |
| | | | 1 | idle | idle | idle |
| | FS_W | 0 | 0 | idle | idle | idle |
| | | | 1 | idle | idle | idle |
| | MS_W | 0 | 0 | idle | idle | idle |
| | | | 1 | idle | idle | idle |
| | SF_P | 0 | 0 | idle | idle | idle |
| | | | 1 | idle | idle | idle |
| | SD_P | 0 | 0 | idle | idle | idle |
| | | | 1 | idle | idle | idle |
| | FS_P | 1 | 0 | idle | idle | idle |
| | | | 1 | switched | switched | switched |
| | MS_P | 1 | 0 | idle | idle | idle |
| | | | 1 | switched | switched | switched |
| | SF_W | 1 | 0 | idle | idle | idle |
| | | | 1 | switched | switched | switched |
| | SD_W | 1 | 0 | idle | idle | idle |
| | | | 1 | switched | switched | switched |
| | WTR | 1 | 0 | [idle] | idle | idle |
| | | | 1 | [WTR] | WTR | WTR |
| | DNR | 1 | 0 | idle | idle | idle |
| | | | 1 | [switched] | switched | switched |
| | EXER_0/1 | 0/1 | 0/1 | idle | impossible | impossible |

FIG. 6

| | | | 0 | idle | idle | idle |
|---|---|---|---|---|---|---|
| Local | LP | 0 | 1 | idle | idle | idle |
| | FS_W | 0 | 0 | idle | idle | idle |
| | | | 1 | idle | idle | idle |
| | MS_W | 0 | 0 | idle | idle | idle |
| | | | 1 | idle | idle | idle |
| | SF_P | 0 | meaningless | idle | idle | idle |
| | SD_P | 0 | 0 | idle | idle | idle |
| | | | 1 | idle | idle | idle |
| | FS_P | 1 | 0 | idle | idle | idle |
| | | | 1 | switched | switched | switched |
| | MS_P | 1 | 0 | idle | idle | idle |
| | | | 1 | switched | switched | switched |
| | SF_W | 1 | 0 | idle | idle | idle |
| | | | 1 | switched | switched | switched |
| | SD_W | 1 | 0 | idle | idle | idle |
| | | | 1 | switched | switched | switched |
| | WTR | 1 | 0 | [idle] | idle | idle |
| | | | 1 | [WTR] | WTR | WTR |
| | DNR | 1 | 0 | [idle] | idle | idle |
| | | | 1 | [switched] | switched | switched |
| | EXER_0/1 | 0/1 | 0/1 | idle | impossible | impossible |
| NR | | 0 | 0 | idle | idle | idle |
| | | | 1 | idle | idle | idle |

FIG. 6 (continued)

HARDWARE-BASED PROTECTION GROUP SWITCHING METHOD AND OPTICAL COMMUNICATION EQUIPMENT

CROSS REFERENCES TO RELATED APPLICATION

This application claims the benefits of priority to Chinese Patent Application No. CN 2017111768297, entitled "Hardware-Based Protection Group Switching Method and Optical Communication Equipment", filed with CNIPA on Nov. 22, 2017, the contents of which are incorporated herein by reference in their entirety.

BACKGROUND OF THE PRESENT DISCLOSURE

Field of Disclosure

The present disclosure relates to the field of optical transport network (OTN) technology, and in particular, to a hardware-based protection group switching method and optical communication equipment.

Description of Related Arts

Optical Transport Network (OTN) is widely used in backbone transport networks. The OTN is fully backward compatible based on a wavelength division multiplexing (WDM) technology. The OTN may be fused with optical synchronous digital Hierarchy devices (SDH) and a WDM device in existing networks, to provide multiplexing, cross connection, and configuration of large granularity traffic, and significantly improve adaptation and transmission efficiency of a transport network for high-bandwidth data. In addition, an OTN device further provides a flexible traffic protection function based on electrical layer and optical layer, for example, subnetwork connection protection (SNCP) and shared ring network protection based on an optical data unit (ODUk) layer. An optical transmission device supporting the traffic protection function may switch the traffic to a standby channel when network fails (for example, a fiber cut or a bit error of a signal), to provide an automatic recovery capability of the traffic.

SUMMARY OF THE PRESENT DISCLOSURE

In view of the foregoing disadvantages in the prior art, an object of the present disclosure is to provide a hardware-based protection group switching method and optical communication equipment, to solve the problems in the prior art.

In order to accomplish the above object and other related objects, the present disclosure provides a hardware-based protection group switching method. The method is applied to optical communication equipment used as a local network element, wherein the optical communication equipment comprises a field programmable gate array (FPGA), a plurality of protection state machines is implemented in the FPGA, the plurality of protection state machines each corresponds to a protection group, the method comprises: transmitting, by the FPGA, the switching triggering information to each protection state machine via a hardware bus when detecting switching triggering information indicating that the local network element has switching triggering; determining, by each protection state machine according to traffic flow information related to the received switching triggering information, one or more related protection groups that are affected by each switching triggering, and generating corresponding switching triggering condition according to switching triggering information; separately querying, by the protection state machines corresponding to the related protection groups, one or more pre-stored tables for automatic protection switching (APS) protocol operation results pre-associated with the switching triggering conditions affecting the related protection groups; and updating, by each protection state machine, a cross connection table according to the operation results, and configuring the updated cross connection table to a cross connection chip or a packet switching chip through the FPGA.

In an embodiment of the present disclosure, the switching triggering information comprises: failure status information and/or changed APS byte information.

In an embodiment of the present disclosure, the transmitting, by the FPGA the switching triggering information to each protection state machine through a hardware bus comprises: generating, when detecting that a failure occurs in an OTN or an APS protocol byte extracted from an OTN line changes, a hardware assistant Protection Switching (HAPS) message according to a failure status or the APS protocol byte, and transmitting the HAPS message to a corresponding protection state machine through the hardware bus.

In an embodiment of the present disclosure, the generating an HAPS packet according to a failure status comprises: determining traffic flow information to which each newly generated failure belongs; and converting, information corresponding to an alarm in the traffic flow information to which the failure status belongs, into a failure code in the HAPS message according to a correspondence, a value of the failure code is in proportion to severity of the alarm, and is also in proportion to a processing priority, so that the protection state machines select an alarm of a highest processing priority for processing according to a comparison result of values of failure codes in the received HAPS packets.

In an embodiment of the present disclosure, the protection group switching method further comprises: detecting the switching triggering information by using a software program; and invoking, when detecting the switching triggering information, the hardware bus to transmit the switching triggering information to the protection state machine.

In an embodiment of the present disclosure, the protection group switching method further comprises: selecting, by a controller module, the FPGA or the software program to transmit the switching triggering information to the protection state machine.

In an embodiment of the present disclosure, the protection group switching method comprises: selecting, by a controller module, the FPGA or the software program to transmit the switching triggering information to the protection state machine, or selecting to replicate the APS byte to a traffic flow of remote network element.

In an embodiment of the present disclosure, first three bytes of an APS/PCC field in an optical data unit-k (ODUk) overhead of the HAPS packet are used to carry a switching request, a protection type, a requested signal, and a bridged signal, and a fourth byte of the APS/PCC field is used to set the failure code.

In an embodiment of the present disclosure, the APS protocol operation results comprise: information about protection switching statuses of the protection groups; a sending APS byte to be sent to remote network element and indicating that an APS protocol status of the local network element is updated; and operation information of a protection switching operation performed on the traffic affected by the failure.

In an embodiment of the present disclosure, the protection group switching method further comprises: updating the sending APS byte of the local network element and the information about the traffic protection switching operation by using the found APS protocol operation results; and transmitting the updated sending APS byte to the remote network element, to enable the remote network element to accordingly perform a corresponding protection switching operation.

In an embodiment of the present disclosure, the protection group switching method further comprises: updating, by the protection state machines, a protection status table according to the APS protocol operation results, wherein the protection status table records the information about the protection switching statuses of the protection groups corresponding to the protection state machines.

In an embodiment of the present disclosure, for the cross connection chip, the cross connection table uses a destination point as an index and uses a source point index as content; for the packet switching chip, the cross connection table is a multicast index (MC-ID) table; and in the MC-ID table, a cross connection is represented by a globally unique MC-ID.

In order to accomplish the above object and other related objects, the present disclosure further provides an optical communication equipment. The optical communication equipment is used as a local network element in an OTN. The optical communication equipment comprises an FPGA. A plurality of protection state machines is implemented therein. The plurality of protection state machines each corresponds to protection groups. The FPGA is configured to: transmit the switching triggering information to each protection state machine through a hardware bus when detecting switching triggering information indicating that the local network element has switching triggering situations;

determine, by each protection state machine according to traffic flow information related to the received switching triggering information, one or more related protection groups affected by each switching triggering situation, and generate each corresponding switching triggering condition according to each piece of switching triggering information; and separately query, by the protection state machines corresponding to the related protection groups, one or more pre-stored tables for APS protocol operation results pre-associated with the switching triggering conditions possibly affecting the related protection groups. The FPGA is in communication connection to a cross connection chip or a packet switching chip, and is configured to update a cross connection table according to the operation results, and configure the updated cross connection table to the cross connection chip or the packet switching chip.

In an embodiment of the present disclosure, the switching triggering information comprises: failure status information and/or changed APS byte information.

In an embodiment of the present disclosure, the transmitting, the switching triggering information to each protection state machine through a hardware bus comprises: when a failure in an OTN or an change of APS protocol byte extracted from an OTN is detected, a hardware assistant Protection Switch (HAPS) packet according to a failure status or the APS protocol byte, and transmitting the HAPS packet to a corresponding protection state machine through the hardware bus.

In an embodiment of the present disclosure, the generating an HAPS packet according to a failure status or the APS protocol byte comprises: determining traffic flow information to which each newly generated failure status belongs; and converting, into a failure code in the HAPS packet according to a correspondence, information corresponding to an alarm in the traffic flow information to which the failure status belongs, wherein a value of the failure code is in direct proportion to severity of the alarm, and is also in direct proportion to a processing priority, so that the protection state machines select, according to a comparison result of values of failure codes in the received HAPS packets, an alarm of a highest processing priority for processing.

In an embodiment of the present disclosure, the optical communication equipment further comprises a software program module, configured to detect the switching triggering information, and invoke, when detecting the switching triggering information, the hardware bus to transmit the switching triggering information to the protection state machine.

In an embodiment of the present disclosure, the optical communication equipment further comprises a controller module, configured to select the FPGA or the software program to transmit the switching triggering information to the protection state machine.

In an embodiment of the present disclosure, the optical communication equipment further comprises a controller module, configured to select the FPGA or the software program to transmit the switching triggering information to the protection state machine, or select to replicate an APS byte to a traffic flow of a remote network element.

In an embodiment of the present disclosure, first three bytes of an APS/PCC field in an ODUk overhead of the HAPS packet are used to carry a switching request, a protection type, a requested signal, and a bridged signal, and a fourth byte of the APS/PCC field is used to set the failure code.

In an embodiment of the present disclosure, the APS protocol operation results comprise: information about protection switching statuses of the protection groups; a sending APS byte that is to be sent to a remote network element and that indicates that an APS protocol status of the local network element is updated; and operation information of a protection switching operation that needs to be performed on a traffic affected by a failure.

In an embodiment of the present disclosure, the optical communication equipment further comprises an optical communication module. The protection state machines are configured to update the sending APS byte of the local network element and the information about the traffic protection switching operation by using the found APS protocol operation results. The optical communication module is configured to transmit the updated sending APS byte to the remote network element, to enable the remote network element to accordingly perform a corresponding protection switching operation.

In an embodiment of the present disclosure, the protection state machines are configured to update a protection status table according to the APS protocol operation results, wherein the protection status table records a switching status of traffic related to a corresponding protection group.

In an embodiment of the present disclosure, for the cross connection chip, the cross connection table uses a destination point as an index and uses a source point index as content; for the packet switching chip, the format of the cross connection table is an MC-ID table; and in the MC-ID table, a cross connection is represented by a globally unique MC-ID.

As described above, the present disclosure discloses the hardware-based protection group switching method and the optical communication equipment. The optical communication equipment comprises at least one FPGA. A plurality of protection state machines is implemented in the FPGA. The plurality of protection state machines respectively corresponds to protection groups. The method comprises: transmitting, by the FPGA when detecting switching triggering information indicating that a local network element possibly has switching triggering situations, the switching triggering information to each protection state machine through a hardware bus; determining, by each protection state machine according to traffic flow information related to the received switching triggering information, one or more related protection groups that are possibly affected by each switching triggering situation, and generating each corresponding switching triggering condition according to each piece of switching triggering information; separately querying, by the protection state machines corresponding to the related protection groups, one or more pre-stored tables for APS protocol operation results pre-associated with the switching triggering conditions possibly affecting the related protection groups; and updating, by each protection state machine, a cross connection table according to the operation results, and configuring the updated cross connection table to a cross connection chip or a packet switching chip through the FPGA. In the present disclosure, a protection switching protocol algorithm is achieved from hardware, multi-group protection switching can also be processed in parallel, a traffic interruption time caused by batch switching is reduced, multi-group protection switching performance is improved, and availability of a network is improved.

BRIEF DESCRIPTION OF THE DRAWINGS

FIG. 3 is a structural diagram of an HAPS message according to an embodiment of the present disclosure.

FIG. 5 is a schematic diagram of a table that queries for current highest-priority requests according to local requests and remote requests according to an embodiment of the present disclosure.

FIG. 6 is a schematic diagram of a table that queries for a switching status according to highest-priority requests and an APS byte.

DETAILED DESCRIPTION OF THE PREFERRED EMBODIMENTS

Figure 1:
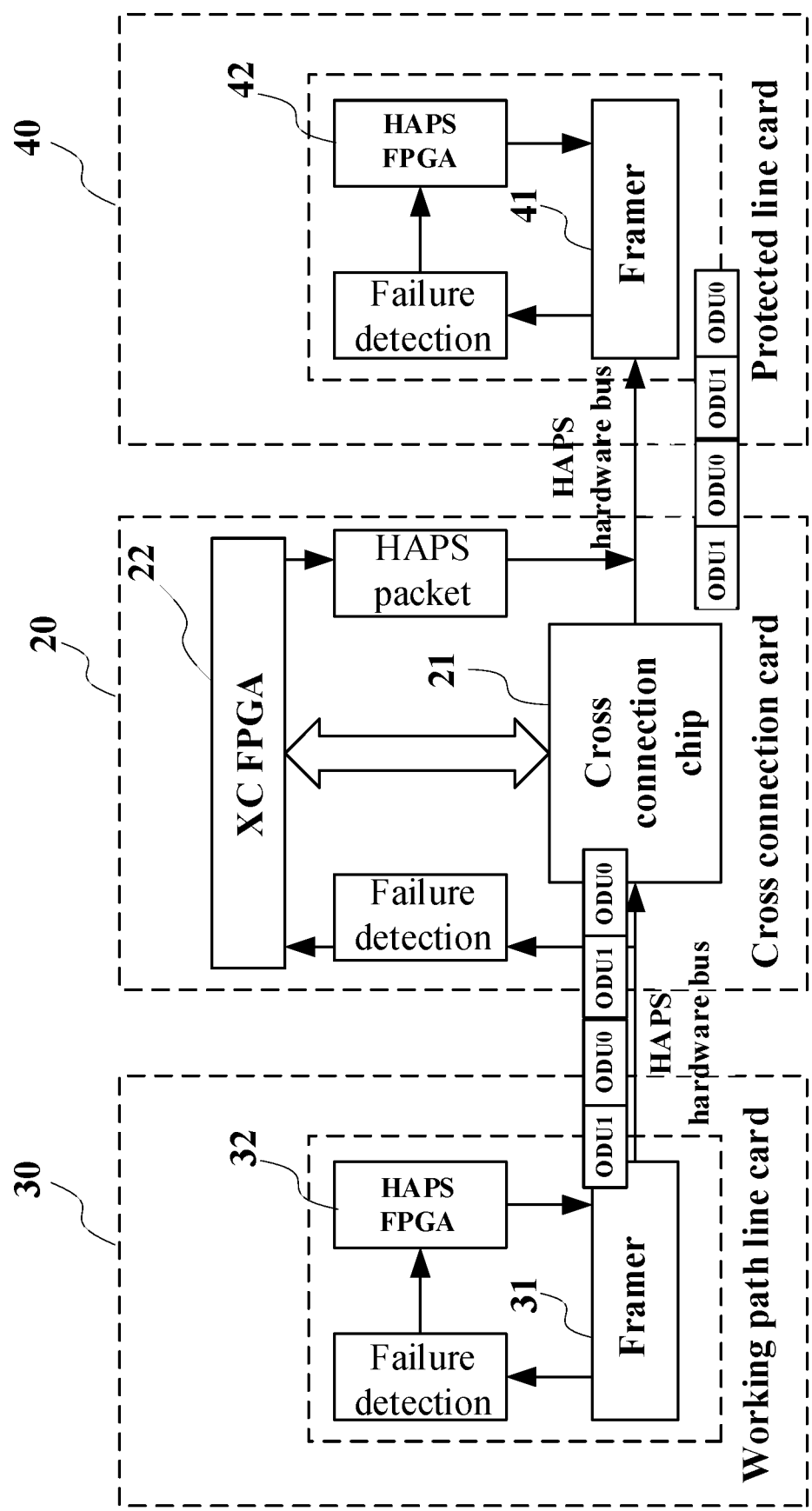
FIG. 1 is a schematic diagram of a principle of performing a switching operation by optical communication equipment according to an embodiment of the present disclosure.

Implementations of the present disclosure are described below by using specific examples. A person skilled in the art can easily understand other advantages and effects of the present disclosure according to the content disclosed in this specification. The present disclosure may further be implemented or applied by using other different specific implementations. Details in this specification may also be modified or changed based on different opinions and applications without departing from the spirit of the present disclosure. It should be noted that, in the case of no contradiction, the following embodiments and features in the embodiments may be combined mutually.

It should be noted that drawings provided in the following embodiments only schematically describe basic ideas of the present disclosure. Therefore, the drawings only show components related to the present disclosure, but are not drawn according to quantities, shapes and sizes of the components during actual implementation. Forms, the quantities and proportions of the components during actual implementation may be changed randomly, and a layout and the forms of the components may be more complex.

For an OTN network carrying traffic of tens Gbit/s or even Tbit/s, once a fiber is damaged, a large quantity of traffic will be interrupted. Therefore, availability of the OTN needs to be improved. An index of network availability is the switching performance. Generally, the traffic recovery time (exchange of all automatic protection switching (APS) bytes related to protecting switching, and completion of a protection switching action of each node) is required to be less than 50 milliseconds, to ensure that a user's call is not affected by any protection switching.

In an actual network environment, if one fiber fails, a plurality of protection groups has traffic on it will be affected, which will cause the protection groups to perform protection switching operations in batches. Protection switching operations of the protection groups are generally performed in series, so the time consumed by protection switching of the protection groups linearly increases with an increase number of the protection groups. When many protection group are configured for a network element node, a total time consumed by protection switching is long. This traffic recovery time is hardly to be less than 50 milliseconds.

A technical solution of the present disclosure is related to improvement of switching performance of an OTN.

The technical solution of the present disclosure is regularly scanning, by an FPGA, switching triggering information of a network element (for example, a framer) supporting an OTN protocol. The switching triggering information indicates a switching may be triggered, for example, a fiber link or a traffic layer fails, or a receiving APS byte extracted from a corresponding OTN line changes. To be specific, the switching triggering information includes failure information and/or an APS byte. Specifically, the FPGA scans a failure and a traffic overhead of the framer. When detecting the failure information or the APS byte that possibly triggers protection switching, the FPGA generates a Hardware Assistant Protection Switching (HAPS) message according to the failure and the APS byte, and transmits the HAPS message to a protection state machine for performing an operation through a hardware bus. A plurality of protection state machines may be implemented in the FPGA according to a maximum switching capacity of a system. Each protection state machine may independently operate APS protocols in parallel. The protection state machine updates a cross connection table according to an operation result. Then the FPGA refreshes a cross connection table result into a cross connection chip or a packet switching chip. According to the method, a protection switching protocol algorithm is achieved by hardware, multi-group protection switching can also be processed in parallel, the traffic interruption time caused by batch switching is reduced, and multi-group protection switching performance is improved.

FIG. 1 shows an embodiment of optical communication equipment implemented based on a cross connection chip according to the present disclosure. In an OTN, the optical communication equipment may be used as a network element. Relative to a remote network element communicating, the optical communication equipment is used as a local network element. In this embodiment, the optical communication equipment comprises a plurality of cards: a cross connection card 20, a working path line card 30, and a protected line card 40. A cross connection chip 21 and an XC FPGA 22 are connected to each other on the cross connection card 20. The XC FPGA 22 is implemented with a plurality of protection state machines. Specific traffic cross connection configuration and protection state calculation both are completed by a protection state machine of the XC FPGA 22.

The working path line card 30 and the protected line card 40 each comprises OTN framers 31, 41, and HAPS FPGAs 32, 42. The OTN framers 31, 41 are connected to the cross connection chip 21 on the cross connection card. The HAPS FPGA 32, 42 are respectively connected to the OTN framers 31, 41, and the XC FPGA 22 on the cross connection card. An OTN traffic enters the OTN framer 31 through a fiber, and optical-to-electrical conversion is first performed to convert an optical signal into an electrical signal. Then the HAPS FPGA 32 separates a failure and an overhead byte from the electrical signal, generates an HAPS message, and transmits an overhead byte required for a protection protocol to the protection state machines of the XC FPGA 22 through a hardware bus supporting an APS protocol for protection calculation. Detailed traffic data enters the cross connection chip 21 for exchanging.

It should be noted that in this embodiment, the line card and the cross connection card are separated from each other. Therefore, a plurality of FPGAs such as the XC FPGA 22 and the HAPS FPGAs 32 and 42 are provided. In another embodiment, alternatively, the XC FPGA 22 and the HAPS FPGAs 32 and 42 may be combined. That is, an entire network element device is a card. Therefore, functions of all network elements comprising a main control card, a cross connection card, and a line card are implemented in the card. An HAPS FPGA and an XC FPGA may be combined. Therefore, this is not limited by this embodiment.

Figure 2:
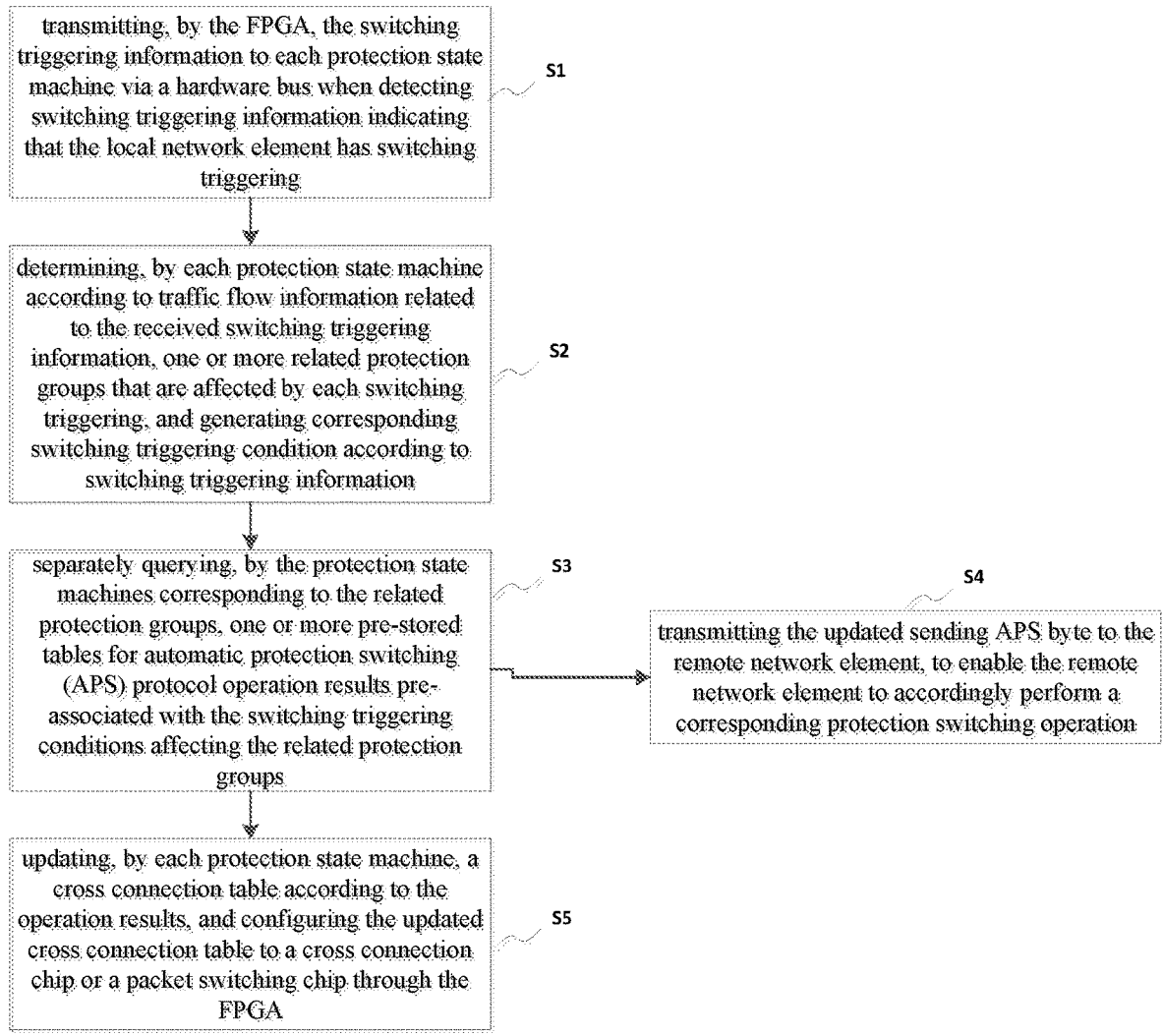
FIG. 2 is a schematic flow chart of a protection group switching method according to an embodiment of the present disclosure.

FIG. 2 shows a hardware-based protection group switching method according to an embodiment of the present disclosure. The method may be applied to, for example, the optical communication equipment in the embodiment shown in FIG. 1 or FIG. 8. A plurality of protection groups is provided in the optical communication equipment, so that each protection state machine of the FPGA corresponds to a protection group for operation.

The method comprises the following steps.

Step S1: when detecting switching triggering information indicating that a local network element need to switch, the FPGA transmits the switching triggering information to each protection state machine through a hardware bus.

As described above, the switching triggering information comprises: failure information and/or changed APS byte information.

In addition, the hardware bus transmits traffic flow information by using an HAPS message, while in the present disclosure, the switching triggering information is transmitted by adding to the HAPS message.

In the HAPS packet, the switching triggering information is converted into a failure code corresponding to the switching triggering occurring in the local network element. The failure code may be generated by using the following method: determining a traffic flow to which each newly generated failure belongs, and converting an alarm in failure traffic flow information into a failure code in the HAPS message according to a correspondence in Table 1 below.

TABLE 1

| Failure alarm | HAPS failure codes (bits 7 to 0) |
|---|---|
| Equipment alarm | Bits 7, Bits 6 |
| Hardware failure-a card unpresent, power card failure, or the like | 11 |
| Software failure-software crash or the like | 10 |
| Reservation for extension | 01 |
| Normal | 00 |
| Line alarm-OTUk | Bits 5, 4, and 3 |
| OTUk_LOF | 111 |
| OTUk_LOM | 110 |
| OTUk_TIM | 101 |
| OTUkAIS | 100 |
| OTUk_DEG | 011 |
| OTUk_EXC | 010 |
| Reservation for extension | 001 |
| Normal | 000 |
| Traffic alarm-ODUk | Bits 2, Bits 1, Bits 0 |
| ODUk_PM_AIS, ODUk_TCMn_AIS | 111 |
| ODUk_PM_LCK, ODUk_TCMn_LCK | 110 |
| ODUk_PM_OCI, ODUk_TCMn_OCI | 101 |
| ODUk_PM_TIM, ODUk_TCMn_TIM | 100 |
| ODUk_PM_DEG, ODUk_TCMn_DEG | 011 |
| ODUk_PM_EXC, ODUk_TCMn_EXC | 010 |
| Reservation for extension | 001 |
| Normal | 000 |

It can be learned from the above table that higher severity of an alarm indicates a larger value of a corresponding failure code, which further indicates a higher protection request priority. If a plurality of alarms is generated for a same traffic simultaneously, a failure code is only generated for a highest-priority alarm. If alarms are generated for both working path and protection path of a protection group simultaneously, failure codes corresponding to the alarms are all input into a protection state machine to compare protection request priorities. Generally, only a failure having a highest-priority request is responded by the state machine.

In an embodiment of the present disclosure, as shown in FIG. 3, a format of the HAPS message is the same as that of an APS channel in the standard. First three bytes of an APS/PCC field in an ODUk overhead are used to carry a switching request, a protection type, a requested signal, and a bridged signal. A fourth byte of the APS/PCC field is reserved, and is used to set the local failure code in the present disclosure.

Preferably, in the foregoing embodiments, the HAPS message is generated by using the FPGA, so as to improve switching performance. However, for a framer providing no interface for the FPGA to scan outside, the HAPS message may be generated by a software program module: Software regularly refreshes the framer and records the current state, and when detecting a fiber link, a traffic layer failure, or a receiving APS byte that possibly triggers protection switching, the software generates a corresponding failure code, and invokes an interface of the hardware bus to send HAPS information to the state machines.

Based on this, preferably, to be compatible with the FPGA or the HAPS message generated by the software, a controller module may be provided to determine whether a failure code and an APS byte that are finally transmitted to the state machines are sent by the FPGA or the software. In addition, to improve performance of ring network protection switching, the controller may be set in the following mode: the HAPS message is not processed by the state machines, and the APS byte is directly replicated to a remote traffic flow.

Figure 4:
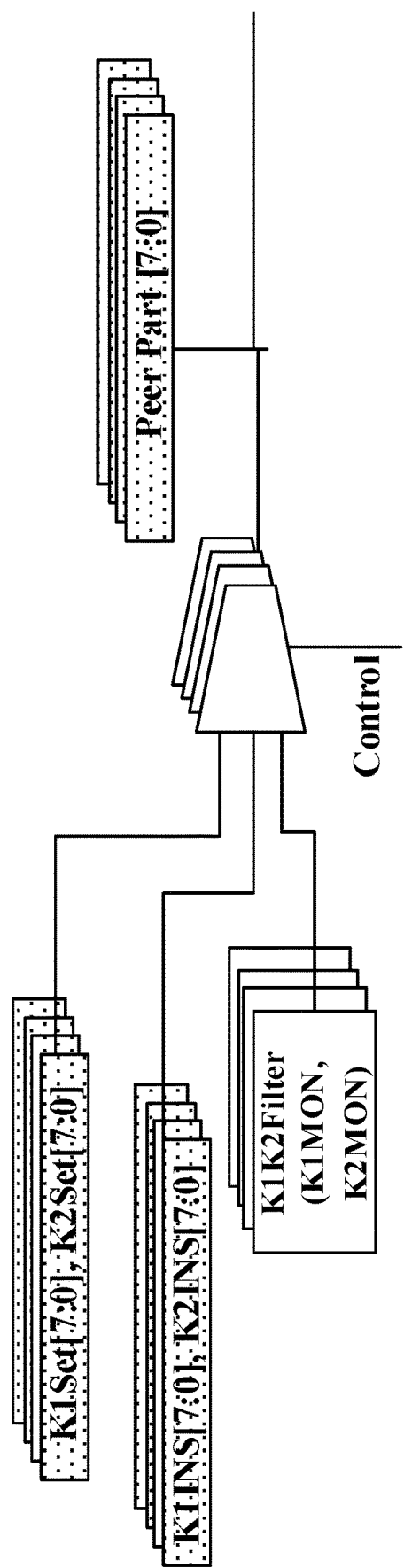
FIG. 4 is a block diagram of a controller module according to an embodiment of the present disclosure.

Three blocks on the left of FIG. 4 respectively represent three registers. APS_INS corresponds to K1INS[7:0] and K2INS[7:0] in the middle. APS_SET corresponds to K1Set [7:0] and K2Set[7:0] on the upper left. APS_MON corresponds to K1K2Filter, K1MON, and K2MON on the lower left.

APS_INS represents a configuration from the software. APS_SET represents a configuration from the FPGA. APS_MON represents a received APS byte. The controller determines, according to a configuration mode of the APS byte, which APS byte is transmitted to the state machines, so that the configuration is flexible.

Step S2: Each protection state machine determines, according to traffic flow information related to the received switching triggering information, one or more related protection groups that are possibly affected by each switching triggering, and generates each corresponding switching triggering condition according to switching triggering information.

In an embodiment, as described above, the traffic flow information is transmitted by using the HAPS message through the hardware bus.

In an embodiment of the present disclosure, the optical communication equipment is configured with protection group information corresponding to network elements. The protection group information includes: a mark number of the protection group, and card information of a working path and a protection path that are occupied by the protection group in the local network element, interface port information, traffic capacities, and time slot information. The protection state machines determine, by determining whether the protection group information is related to traffic flow information of a traffic flow having a failure, the protection group affected by the switching triggering.

If the failure traffic flow is related to none of the protection groups, the failure traffic flow information is discarded. If a protection group is related to the traffic flow information, the protection group is determined as an affected protection group. Then the alarm information in the traffic flow information is converted into a triggering condition of the protection group according to the OTN protocol. States of a working port and a protection port of a network element device may be classified into three types: SF (a signal failure), SD (signal degradation), and NORMAL (normal signal). SF and SD correspond to failure states. Alarms of generating SF include LOS, AIS, LOF, LOM, and TTI. An alarm of generating SD may be DEG. Therefore, triggering conditions generated based on this may be categorized into a signal failure type and a signal degradation type.

Step S3: The protection state machines corresponding to the related protection groups separately query one or more pre-stored tables for APS protocol operation results pre-associated with the switching triggering conditions possibly affecting the related protection groups.

In an embodiment of the present disclosure, when the protection state machines receive a plurality of groups of triggering conditions that are generated simultaneously, in order to improve switching performance, APS protocol operation is not performed on each of the plurality of protection groups in turn, but instead, a protection calculation result is queried by table lookup.

The table lookup is storing, into one or more tables, some results calculated in advance, namely, APS protocol operation results of each protection group in combined input conditions of various triggering conditions, when receiving reported triggering condition information of multi-group protection, comparing triggering condition combinations with the input conditions of the table into which the results are stored, and directly finding protection switching status results of the protection groups. In this process, APS protocol operations of the protection groups are parallel and independent.

Preferably, in an embodiment of the present disclosure, one or more tables are provided. The protection tables and the table lookup may be shown as below:

(a) providing a first lookup table compared with switching triggering condition of a local network element device, wherein the first lookup table may be a two-dimensional array using failure statuses of local working ports and protection ports and external commands as coordinates, and comparing priorities in an order specified by the protocol, wherein output results are local highest-priority requests;

(b) providing a second lookup table compared with related switching triggering conditions of a local network element device and a remote network element device. The second lookup table is a two-dimensional array using the local highest-priority requests output in the step (a) and remote requests from the remote network element as coordinates. The comparison is the same as that in the step (a). If priorities of the local requests is the same as that of the remote requests, path numbers of the requests are the same, priority is given to the remote request, and the output results are current highest-priority requests of the state machines;

(c) providing a third lookup table of switching results of the state machines, wherein an input condition of the third lookup table is the current highest-priority requests output by searching the second lookup table in the step (b), the path numbers of the remote requests, and the channel numbers of the local requests, when the path numbers of the remote requests and the local requests are the same, switching to the protection path, otherwise, switching to the working path, and the switching result is a state that the protection groups should enter;

(d), providing a fourth lookup table similar to the third lookup table, and a fifth lookup table. The fourth lookup table uses the current highest-priority requests output by the second lookup table as input and is used to query for a bridging result of the state machines, the fifth lookup table is used for searching for a sending APS byte; and (e) querying, according to the switching triggering conditions obtained in the step S2, the first lookup table compared with the local input condition, to obtain the local highest-priority requests; querying the second lookup table compared with the local and remote input conditions, to obtain the current highest-priority request; and then respectively querying the third lookup table, the fourth lookup table, and the fifth lookup table of the switching results, the bridging result of the state machines, and the sending APS byte, to obtain all output results.

According to the foregoing descriptions, the APS protocol operation results include: information about protection switching of the protection groups; a sending APS byte that is to be sent to a remote network element, the APS byte indicates that an APS protocol status of the local network element is updated; and operation information of a protection switching operation that needs to be performed on a traffic affected by a failure.

After the APS protocol operation results are found in the step S3, the sending APS byte of the local network element and the information about the traffic protection switching operation are updated according to the automatic APS protocol operation results.

Further, as in the step S4: Transmitting the updated sending APS byte to the remote network element, so as to enable the remote network element to perform a corresponding protection switching accordingly.

More specifically, according to the embodiments of the present disclosure, the failure states of the working port and the protection port of the local network element device may be classified into three types: SF (a signal failure), SD (signal degradation), and NORMAL (normal signal). Alarms of generating SF comprise LOS, AIS, LOF, LOM, and TTI. An alarm of generating SD comprises DEG. There are the following five line failures in combination depend on that the failure occurs at the working port or the protection port:

SF_P (a signal failure at the protection port)
SF_W (a signal failure at the working port)
SD_P (signal degradation at the protection port)
SD_W (signal degradation at the working port)
NORMAL (normal signal at the working and protection ports)

According to the embodiments of the present disclosure, the external commands of the local network element device comprise seven types in descending order of priorities:

CLEAR—clear command
LP—protection lock command
FS_W—forcing to switching to the working port
FS_P—forcing to switching to the protection port
MS_W—manually switching to the working port
MS_P—manually switching to the protection port
EXER_P and EXER_W—exercising switching command (the working/protection port)

According to the protocol, a structure of the receiving APS byte is shown in FIG. 3. The first three bytes of the APS/PCC field in the ODUk overhead are used to carry a switching request, a protection type, a requested signal, and a bridged signal.

According to the embodiments of the present disclosure, states of a remote network element device that are represented by using an APS byte are classified into the following three categories (15 types in total):

remote line conditions: SF (the working/protection port) and SD (the working/protection port), namely, four types;
remote external commands: LP and FS (a working/protection port), MS (a working/protection port), and EXER (the working/protection port), namely, seven types; and
remote external MSP states: WTR (Wait to Restore), DNR (do not return), NR (no request), and RR (Reply request), namely, four types.

A 1+1 bidirectional protection state machine is used as an example. Current highest-priority requests of the protection groups are queried for according to local requests and remote requests by using the table in FIG. 5. An uppermost row is the remote requests. A leftmost column is the local requests. Content of the table in FIG. 5 is the current highest-priority requests of the protection groups in various combinations of the local requests and the remote requests. If the current highest-priority requests have symbols ®, it indicates that the current highest-priority requests are requests from the remote network element device.

In an embodiment of the present disclosure, FIG. 6 shows a table for querying for states of the protection groups according to highest-priority requests (Highest REQUEST) and the received APS byte. The states of the protection groups comprise idle, protection switched (switched), or waiting to restore (WTR).

In the table shown in FIG. 6, "requested signal" in the sending APS byte is compared with "bridged signal" in the receiving APS byte (as shown in FIG. 3). If the two both are 1, the local network element device selectively receives signals from protection ports. If the two are inconsistent or both are 0, the network element device selectively receives signals from working ports.

In an embodiment of the present disclosure, the APS protocol operation results obtained by querying the table comprise: switching results of the protection groups; a sending APS byte that is to be sent to a remote network element device, sending APS byte indicates that an APS protocol status of the local network element is updated; and operation information of a protection switching operation that needs to be performed on a traffic affected by a failure.

An example is used to describe a table query process. For a network element A, when a signal failure is detected on working paths, data in a table in the format shown in FIG. 5 that is pre-stored locally or remotely is first queried. The local requests are SF_W, and the remote requests are NR. Therefore, the current highest-priority requests are SF_W. Then data in the table shown in FIG. 6 which is pre-stored by the network element A locally or remotely is queried. The current highest-priority requests are local SF_W, remote request signals are 0, and current states are idle. Therefore, a current switching state should remain Idle.

For a network element B, when an APS byte SF_W® from the network element A is detected, data in the table shown in FIG. 5 that is pre-stored by the network element B locally or remotely is queried. The local requests are NR. Therefore, the current highest-priority requests are SF_W. Then data in the table shown in FIG. 6 that is pre-stored by the network element B locally or remotely is queried. The current highest-priority requests are remote SF_W®, remote request signals are 1, and current states are idle. Therefore, a current state should become switched.

When the network element A detects an APS byte RR from the network B, data in the table shown in FIG. 5 is queried. The local requests are still SF_W. Therefore, the current highest-priority requests are still SF_W. Data in a table in the format shown in FIG. 6 is queried, the remote request signals are 1, and the current states are Idle. Therefore, the current state also should become switched.

Step S5: updating a cross connection table according to the operation results by each protection state machine, and configuring the updated cross connection table to a cross connection chip or a packet switching chip through the FPGA.

In an embodiment of the present disclosure, the protection state machines update the cross connection table and a protection status table according to the APS protocol operation results. The protection status table may be one of the tables queried in the table lookup manner of step S3.

Figure 7A:
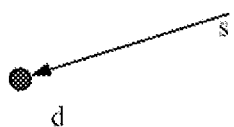
FIG. 7a is structural diagram of network element node transferring when a traffic normally works.

Specifically, Table 2 shows the cross connection table. The table records a configuration of each group of actual cross connections. FIG. 7a shows a cross connection from s to d. In the cross connection table, the cross is a row of records using d as an index. Content of a traffic source point of the record is filled with an index of a point s.

TABLE 2

| Traffic sink point | Traffic source point |
| --- | --- |
| 0 | 1 |
| 1 | 4 |
| ... | |
| d | s |
| ... | |

Figure 7B:
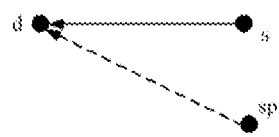
FIG. 7b is a structural diagram of network element node transferring when a traffic is switched.

Table 3 shows the protection status table. The protection status table records a switching state of each of the traffic related to the protection groups in a system. With reference to FIG. 7b, the protection traffic selectively received from s (a working path) and sp (a protection path) and having a traffic sink point d, is a row of records using d as an index in the protection status table. The working path of the record is an index of s, and a protection path is an index of sp. A switching state represents a current protection switching state of the protection groups. The switching state may be the working path or the protection path, and is filled by the protection state machines according to the APS protocol operation results.

TABLE 3

| Traffic sink point | Protection enabled | Working path | Protection path | Switching status |
| --- | --- | --- | --- | --- |
| ... | | | | |
| d | True | s | sp | working |
| ... | | | | |

If the protection groups are at the working path, d receives traffic from the point s. The state machines change a switching status in the protection status table as working, and update the cross connection table according to the result. Content of a traffic source point of a record using d as an index is filled with the index of the point s. If of the protection groups are at the protection path, d receives a traffic from the point sp. The state machines change the switching status in the protection status table as protecting, and update the cross connection table according to the result. Content of a traffic source point of the record using d as an index is filled with the index of the point sp.

The updated cross connection table is fully configured into the cross connection chip or the packet switching chip through the FPGA. For the cross connection chip, the configuration format is a cross connection table using a destination point as an index and using a source point index as content.

In the embodiment of FIG. 1, the optical communication equipment uses a cross connection chip. The XC FPGA is located on the cross connection card, is connected to the cross connection chip, configures the cross connection table into traffic cross connection chip according to the protection switching statuses, and performs traffic protection switching operation.

Figure 8:
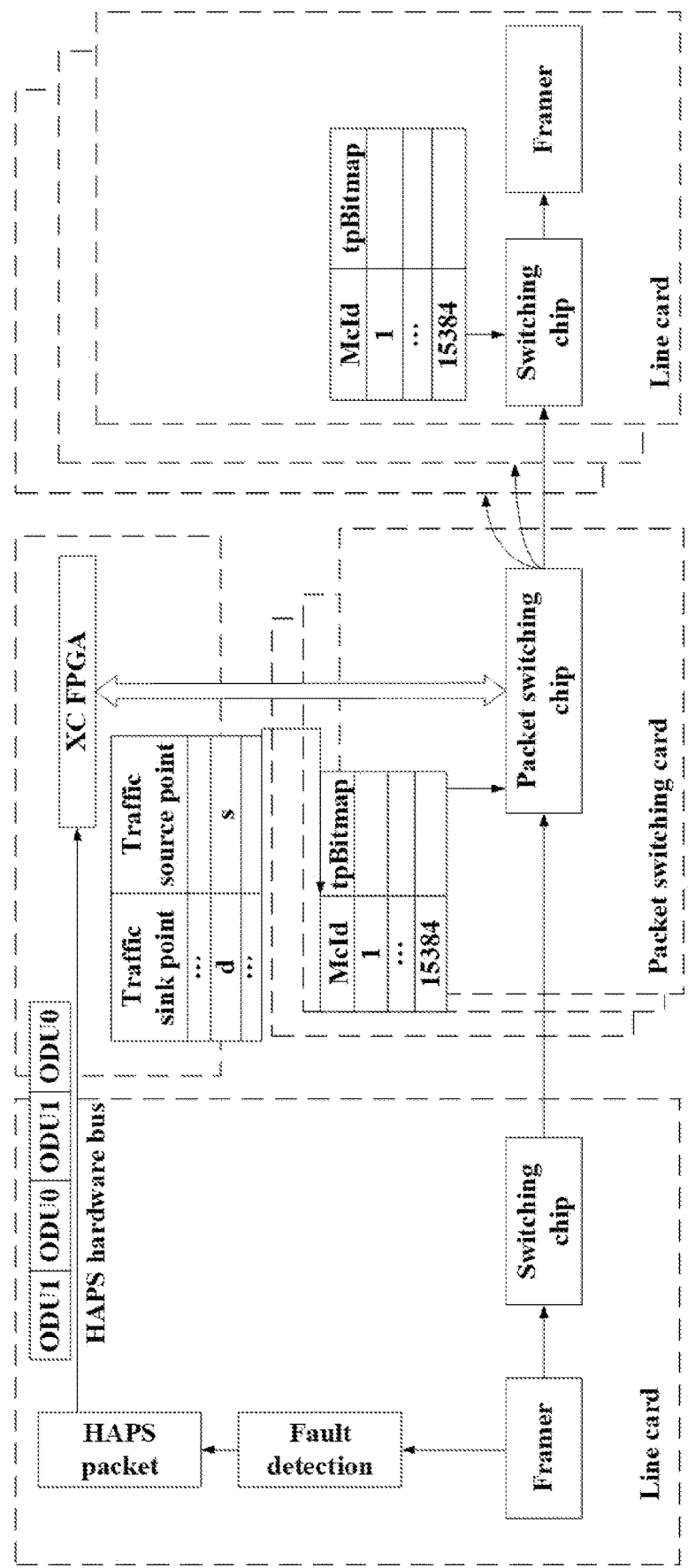
FIG. 8 is a schematic diagram of a principle of performing a switching operation by optical communication equipment according to another embodiment of the present disclosure.

In an embodiment shown in FIG. 8, a packet switching chip on a packet switching card is located on a line card and a cross connection card on which the sink point is located. The XC FPGA is located on the cross connection card. In this embodiment, the cross connection table is converted into a Multicast ID (MC-ID) table to configure into the packet switching chip. In the MC-ID table, a cross from s to d is a row of records using s as an index, and is represented by a globally unique MC-ID.

Essentially, content expressed by the MC-ID table is equivalent to the cross connection table. From the view of effects, by configuring the cross connection table into the cross connection chip or configuring the MC-ID table into the packet switching chip, a physical traffic cross path can be established from hardware.

In conclusion, the present disclosure discloses the hardware-based protection group switching method and the optical communication equipment. The optical communication equipment comprises at least one FPGA. A plurality of protection state machines is implemented in the FPGA. The plurality of protection state machines respectively corresponds to protection groups. The method comprises: transmitting, by the FPGA when detecting switching triggering information indicating that a local network element possibly has switching triggering situations, the switching triggering information to each protection state machine through a hardware bus; determining, by each protection state machine according to traffic flow information related to the received switching triggering information, one or more related protection groups that are possibly affected by each switching triggering situation, and generating each corresponding switching triggering condition according to each piece of switching triggering information; separately querying, by the protection state machines corresponding to the related protection groups, one or more pre-stored tables for APS protocol operation results pre-associated with the switching triggering conditions possibly affecting the related protection groups; and updating, by each protection state machine, a cross connection table according to the operation results, and configuring the updated cross connection table to a cross connection chip or a packet switching chip through the FPGA.

Compared with the prior art, the present disclosure has the following beneficial effects:

(1) Switching performance is improved. The method and the equipment provided in the present disclosure achieves a protection switching protocol algorithm by hardware, which can process multi-group protection switching in parallel, greatly reduce a traffic interruption time caused by multi-group protection switching, and improve protection switching performance.

(2) The present disclosure is flexible in setting and wide in applicability. The method and the equipment provided in the present disclosure are different from grouping protection specified in the protocol. Protection group and traffic layer information do not need to be preset. Batch switching instead of uniform protection switching fixed to a traffic layer is implemented without affecting independent protection of protection groups. Configuration flexibility is maximally provided. The method and the equipment are applicable to various topologies, comprising linear or ring network protection.

The foregoing embodiments merely exemplarily describe the principles and effects of the present disclosure, but are not intended to limit the present disclosure. Any person skilled in the art may modify or change the foregoing embodiments without departing from the spirit and scope of the present disclosure. Therefore, any equivalent modification or change made by any person of ordinary skill in the art without departing from the spirit and technical ideas disclosed in the present disclosure shall fall within the claims of the present disclosure.

What is claimed is:

1. A hardware-based protection group switching method, applied to optical communication equipment used as a local network element, wherein the optical communication equipment comprises a field programmable gate array (FPGA), a plurality of protection state machines is provided in the FPGA, the plurality of protection state machines each corresponds to a protection group, the method comprises:

transmitting, by the FPGA, a switching triggering information to each protection state machine via a hardware bus when detecting the switching triggering information indicating that the local network element has switching triggering situations;

determining, by each protection state machine according to traffic flow information related to the switching triggering information, one or more related protection groups that are affected by each switching triggering situation, and generating a corresponding switching triggering condition according to the switching triggering information;

separately querying, by each protection state machine corresponding to the related protection groups, one or more pre-stored tables for automatic protection switching (APS) protocol operation results pre-associated with the switching triggering condition affecting the related protection groups; and updating, by each protection state machine, a cross connection table according to the operation results, and configuring the updated cross connection table to a cross connection chip or a packet switching chip through the FPGA.

2. The protection group switching method as in claim 1, wherein the switching triggering information comprises failure status information and/or changed APS byte information.

3. The protection group switching method as in claim 2, wherein the transmitting, by the FPGA the switching triggering information to each protection state machine via a hardware bus comprises:

generating, when detecting that a failure occurs in an optical transport network (OTN) or an APS protocol byte extracted from an OTN line changes, a hardware APS (HAPS) message according to a failure status or the APS protocol byte, and transmitting the HAPS message to a corresponding protection state machine through the hardware bus.

4. The protection group switching method as in claim 3, wherein the generating an HAPS message according to a failure status comprises:

determining traffic flow information to which each failure status belongs; and converting information corresponding to an alarm in a traffic flow information to which the failure status belongs into a failure code in the HAPS message according to a correspondence, wherein a value of the failure code is in proportion to severity of the alarm, and is also in proportion to a processing priority, so that the protection state machines select an alarm of a highest processing priority for processing according to a comparison result of values of failure codes in HAPS packets.

5. The protection group switching method as in claim 2, further comprising:

detecting the switching triggering information by using a software program; and invoking, when detecting the switching triggering information, the hardware bus to transmit the switching triggering information to each protection state machine.

6. The protection group switching method as in claim 5, further comprising: selecting, by a controller module, the FPGA or the software program to transmit the switching triggering information to each protection state machine.

7. The protection group switching method as in claim 5, comprising: selecting, by a controller module, the FPGA or the software program to transmit the switching triggering information to each protection state machine, or selecting to replicate an APS byte to a traffic flow of a remote network element.

8. The protection group switching method as in claim 3, wherein a first three bytes of an APS/protection-communication-channel (APS/PCC) field in an optical data unit-k (ODUk) overhead of a HAPS packet are used to carry a switching request, a protection type, a requested signal, and a bridged signal, and a fourth byte of the APS/PCC field is used to set a failure code.

9. The protection group switching method as in claim 2, wherein the APS protocol operation results comprise:

information about protection switching statuses of the protection groups;

a sending APS byte to be sent to a remote network element and indicating that an APS protocol status of the local network element is updated; and operation information of a protection switching operation performed on a traffic affected by a failure.

10. The protection group switching method as in claim 9, further comprising:

updating the sending APS byte of a local network element and an information about a traffic protection switching operation by using the APS protocol operation results; and transmitting the updated sending APS byte to the remote network element, to enable the remote network element to accordingly perform a corresponding protection switching operation.

11. The protection group switching method as in claim 9, further comprising:

updating, by the protection state machines, a protection status table according to the APS protocol operation results, wherein the protection status table records an information about the protection switching statuses of the protection groups corresponding to the protection state machines.

12. The protection group switching method as in claim 1, wherein for the cross connection chip, the cross connection table uses destination point as an index and uses a source point index as content; for the packet switching chip, the cross connection table is a multicast index (MC-ID) table; and in the MC-ID table, a cross is represented by a globally unique MC-ID.

13. An optical communication equipment, used as a local network element in an optical transport network (OTN), wherein the optical communication equipment comprises:

a field programmable gate array (FPGA), wherein a plurality of protection state machines is provided in the FPGA, and the plurality of protection state machines each corresponds to protection groups, wherein the FPGA is configured to transmit a switching triggering information to each protection state machine through a hardware bus when detecting the switching triggering information indicating that the local network element has switching triggering situations;

determine, by each protection state machine according to traffic flow information related to the switching triggering information, one or more related protection groups affected by each switching triggering situation, generate a corresponding switching triggering condition according to the switching triggering information; and separately query, by each protection state machine corresponding to the related protection groups, one or more pre-stored tables for automatic protection switching (APS) protocol operation results pre-associated with the switching triggering condition possibly affecting the related protection groups, and the FPGA is in communication connection to a cross connection chip or a packet switching chip, and is configured to update a cross connection table according to the operation results, and configure the updated cross connection table to the cross connection chip or the packet switching chip.

14. The optical communication equipment as in claim 13, wherein the switching triggering information comprises: failure status information and/or changed APS byte information.

15. The optical communication equipment as in claim 14, wherein the transmitting the switching triggering information to each protection state machine through a hardware bus comprises:
generating, when a failure in an OTN or a change of APS protocol byte extracted from an OTN is detected, a hardware assistant PS (HAPS) packet according to a failure status or the APS protocol byte, and transmitting the HAPS packet to a corresponding protection state machine through the hardware bus.

16. The optical communication equipment as in claim 15, wherein the generating an HAPS packet comprises:
determining traffic flow information to which each failure status belongs; and
converting, into a failure code in the HAPS packet according to a correspondence, information corresponding to an alarm in a traffic flow information to which the failure status belongs, wherein a value of the failure code is in proportion to severity of the alarm, and is also in proportion to a processing priority, so that the protection state machines select, according to a comparison result of values of failure codes in HAPS packets, an alarm of a highest processing priority for processing.

17. The optical communication equipment as in claim 13, further comprising:
a software program module, configured to detect the switching triggering information, and invoke, when detecting the switching triggering information, the hardware bus to transmit the switching triggering information to each protection state machine.

18. The optical communication equipment as in claim 17, further comprising a controller module, configured to select the FPGA or the software program to transmit the switching triggering information to each protection state machine.

19. The optical communication equipment as in claim 17, further comprising a controller module, configured to select the FPGA or the software program for transmitting the switching triggering information to each protection state machine, or select to replicate an APS byte to a traffic flow of a remote network element.

20. The optical communication equipment as in claim 15, wherein a first three bytes of an APS/PCC field in an optical channel data unit-k (ODUk) overhead of the HAPS packet are used to carry a switching request, a protection type, a requested signal, and a bridged signal, and a fourth byte of the APS/PCC field is used to set a failure code.

21. The optical communication equipment as in claim 14, wherein the APS protocol operation results comprise:
information about protection switching statuses of the protection groups;
a sending APS byte to be sent to a remote network element and indicating that an APS protocol status of the local network element is updated; and
operation information of a protection switching operation to be performed on a traffic affected by a failure.

22. The optical communication equipment as in claim 21, further comprising an optical communication module, wherein the protection state machines are configured to update the APS byte of the local network element and an information about a traffic protection switching operation by using the APS protocol operation results; and
the optical communication module is configured to transmit the updated sending APS byte to the remote network element, to enable the remote network element to accordingly perform a corresponding protection switching operation.

23. The optical communication equipment as in claim 21, wherein the protection state machines are configured to update a protection status table according to the APS protocol operation results, the protection status table records a switching status of the traffic related to a corresponding protection group.

24. The optical communication equipment as in claim 13, wherein for the cross connection chip, the cross connection table uses a destination point as an index and uses a source point index as content; for the packet switching chip, the format of the cross connection table is a multicast index (MC-ID) table; and in the MC-ID table, a cross connection is represented by a globally unique MC-ID.

* * * * *